United States Patent
Shelansky et al.

(10) Patent No.: US 9,106,424 B2
(45) Date of Patent: Aug. 11, 2015

(54) METHOD AND SYSTEM FOR PROVIDING USERS LOGIN ACCESS TO MULTIPLE DEVICES VIA A COMMUNICATION SYSTEM

(75) Inventors: Andrew R. Shelansky, Irvine, CA (US); Dang Van Tran, Laguna Niguel, CA (US); Fabio Gava, Ladera Ranch, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 359 days.

(21) Appl. No.: 12/885,214

(22) Filed: Sep. 17, 2010

(65) Prior Publication Data

US 2011/0167355 A1 Jul. 7, 2011

Related U.S. Application Data

(60) Provisional application No. 61/292,144, filed on Jan. 4, 2010.

(51) Int. Cl.
*H04L 9/32* (2006.01)
*G06F 21/41* (2013.01)
*H04L 29/06* (2006.01)

(52) U.S. Cl.
CPC ............ *H04L 9/32* (2013.01); *G06F 21/41* (2013.01); *H04L 63/10* (2013.01)

(58) Field of Classification Search
CPC .................... H04N 21/43615; H04N 21/4532; G06F 3/0481; G06F 3/048; G06F 9/44505; G06F 17/30867; G06Q 50/01; G06Q 10/101
USPC .......................................... 715/717, 740, 750
See application file for complete search history.

(56) References Cited

U.S. PATENT DOCUMENTS

| | | | |
|---|---|---|---|
| 4,672,572 A | 6/1987 | Alsberg | |
| 5,933,498 A | 8/1999 | Schneck et al. | |
| 5,973,683 A | 10/1999 | Cragun et al. | |
| 6,170,014 B1 | 1/2001 | Darago et al. | |
| 6,813,775 B1 * | 11/2004 | Finseth et al. | 725/46 |
| 7,131,132 B1 | 10/2006 | Gehlot et al. | |
| 7,698,720 B2 | 4/2010 | Matz | |
| 7,895,076 B2 | 2/2011 | Kutaragi et al. | |
| 8,079,042 B2 | 12/2011 | Foti et al. | |
| 8,185,949 B2 | 5/2012 | Jonsson | |
| 8,356,337 B2 | 1/2013 | Scott et al. | |

(Continued)

FOREIGN PATENT DOCUMENTS

EP    1489800 A1 * 12/2004 ............. H04L 12/58

OTHER PUBLICATIONS

NIELSENMEDIA.COM, "Our Measurement Techniques | Nielsen Media Research", webpage printed Apr. 14, 2009, pp. 1-2, The Nielsen Company, USA.

(Continued)

*Primary Examiner* — Shen Shiau
(74) *Attorney, Agent, or Firm* — Sherman IP LLP; Kenneth L. Sherman; Steven Laut

(57) ABSTRACT

Multiple user, multiple login access to electronic devices in a communication system is provided. In response to user login requests, login access is controlled by providing multiple users login access to plural electronic devices capable of communicating via the communication system. Each electronic device allows multiple users to be logged on or logged off the electronic device concurrently. User profiles and activity are shared between the plural electronic devices.

48 Claims, 11 Drawing Sheets

(56) References Cited

U.S. PATENT DOCUMENTS

| | | | |
|---|---|---|---|
| 8,443,068 B2* | 5/2013 | Lee et al. | 709/223 |
| 8,639,214 B1* | 1/2014 | Fujisaki | 455/406 |
| 2002/0023132 A1* | 2/2002 | Tornabene et al. | 709/205 |
| 2002/0026483 A1* | 2/2002 | Isaacs et al. | 709/206 |
| 2002/0034281 A1* | 3/2002 | Isaacs et al. | 379/88.12 |
| 2002/0087625 A1 | 7/2002 | Toll et al. | |
| 2003/0084138 A1* | 5/2003 | Tavis et al. | 709/223 |
| 2003/0151621 A1 | 8/2003 | McEvilly et al. | |
| 2004/0260753 A1* | 12/2004 | Regan | 709/200 |
| 2005/0160458 A1 | 7/2005 | Baumgartner | |
| 2006/0031381 A1 | 2/2006 | Van Luijt et al. | |
| 2006/0143717 A1 | 6/2006 | Ransome et al. | |
| 2006/0149955 A1* | 7/2006 | Velhal et al. | 713/1 |
| 2006/0256734 A1 | 11/2006 | Erhart et al. | |
| 2007/0043720 A1* | 2/2007 | Koenig et al. | 707/6 |
| 2007/0183746 A1 | 8/2007 | Haeuser et al. | |
| 2007/0256019 A1* | 11/2007 | Hirsave et al. | 715/741 |
| 2008/0092171 A1* | 4/2008 | Roberts et al. | 725/46 |
| 2008/0114737 A1* | 5/2008 | Neely et al. | 707/3 |
| 2008/0249987 A1 | 10/2008 | Ogasawara | |
| 2008/0275974 A1 | 11/2008 | Rackiewicz | |
| 2008/0288996 A1 | 11/2008 | Walter et al. | |
| 2008/0311889 A1* | 12/2008 | Dunko et al. | 455/414.1 |
| 2009/0138805 A1 | 5/2009 | Hildreth | |
| 2009/0234876 A1 | 9/2009 | Schigel et al. | |
| 2009/0248602 A1 | 10/2009 | Frazier | |
| 2009/0300671 A1 | 12/2009 | Scott et al. | |
| 2010/0211884 A1 | 8/2010 | Kashyap et al. | |
| 2010/0212001 A1* | 8/2010 | Kashyap et al. | 726/7 |
| 2011/0125906 A1* | 5/2011 | Chunilal | 709/226 |
| 2011/0161085 A1* | 6/2011 | Boda et al. | 704/260 |
| 2011/0185437 A1* | 7/2011 | Tran et al. | 726/28 |
| 2011/0225293 A1* | 9/2011 | Rathod | 709/224 |
| 2011/0311206 A1* | 12/2011 | Hubner et al. | 386/297 |
| 2013/0019186 A1* | 1/2013 | Lance et al. | 715/753 |

OTHER PUBLICATIONS

NIELSENMEDIA.COM, "Installing and Monitoring Meters | Nielsen Media Research", webpage printed Apr. 14, 2009, p. 1, The Nielsen Company, USA.

NIELSENMEDIA.COM, "Metering Television in the Digital Age| Nielsen Media Research", webpage printed Apr. 14, 2009, p. 1, The Nielsen Company, USA.

NIELSENMEDIA.COM, "New Challenges & Ideas | Nielsen Media Research", webpage printed Apr. 14, 2009, p. 1, The Nielsen Company, USA.

U.S. Non-Final Office Action for U.S. Appl. No. 12/371,365 mailed Jun. 6, 2012.

U.S. Final Office Action for U.S. Appl. No. 12/371,365 mailed Sep. 21, 2012.

U.S. Non-Final Office Action for U.S. Appl. No. 12/371,365 mailed Nov. 23, 2012.

U.S. Non-Final Office Action for U.S. Appl. No. 12/371,444 mailed Apr. 21, 2011.

U.S. Final Office Action for U.S. Appl. No. 12/371,444 mailed Aug. 16, 2011.

U.S. Advisory Action for U.S. Appl. No. 12/371,444 mailed Oct. 20, 2011.

U.S. Non-Final Office Action for U.S. Appl. No. 12/371,444 mailed Nov. 29, 2011.

U.S. Final Office Action for U.S. Appl. No. 12/371,444 mailed Mar. 28, 2012.

U.S. Advisory Action for U.S. Appl. No. 12/371,444 mailed Jul. 11, 2012.

U.S. Advisory Action for U.S. Appl. No. 12/371,444 mailed Aug. 14, 2012.

U.S. Final Office Action for U.S. Appl. No. 12/371,444 mailed May 29, 2014.

U.S. Final Office Action for U.S. Appl. No. 13/083,429 mailed Aug. 29, 2014.

U.S. Non-Final Office Action for U.S. Appl. No. 13/083,429 mailed Feb. 12, 2014.

U.S. Advisory Action for U.S. Appl. No. 13/083,429 mailed Dec. 1, 2014.

European Search Report dated Nov. 19, 2014 for European Application No. 11181460.4 from European Patent Office, pp. 1-7, Munich, Germany.

U.S. Non-Final Office Action for U.S. Appl. No. 13/083,429 mailed Jan. 5, 2015.

U.S. Final Office Action for U.S. Appl. No. 12/371,365 mailed May 8, 2013.

U.S. Notice of Allowance for U.S. Appl. No. 12/371,365 mailed Jul. 25, 2013.

* cited by examiner

METHOD AND SYSTEM FOR PROVIDING USERS LOGIN ACCESS TO MULTIPLE DEVICES VIA A COMMUNICATION SYSTEM

RELATED APPLICATION

This application claims priority from U.S. Provisional Patent Application Ser. No. 61/292,144 filed on Jan. 4, 2010, incorporated herein by reference.

FIELD OF THE INVENTION

The present invention relates in general to multi-user systems, and in particular to managing multi-user devices.

BACKGROUND OF THE INVENTION

Conventional multi-user electronic systems involve the use of individual "user accounts", "user profiles", or "logins" (collectively, "logins") for access to electronic devices such as consumer electronics (CE) devices, computing devices, etc. In many of such devices, only a single user can be logged into a device and active at any one time. Multiple users are not effectively able to share any single device between them.

BRIEF SUMMARY OF THE INVENTION

Embodiments of the invention provide users login access to multiple electronic devices via a communication system. In one embodiment, in response to user login requests, login access is controlled by providing multiple users login access to plural electronic devices capable of communicating via the communication system. Each electronic device allows multiple users to be logged on or logged off the electronic device concurrently. User profiles and activity are shared between the plural electronic devices.

These and other features, aspects and advantages of the present invention will become understood with reference to the following description, appended claims and accompanying figures.

DESCRIPTION OF THE INVENTION

Embodiments of the present invention provide multi-user, multi-device login method and system for multiple electronic devices. According to an embodiment of the invention, a login control system implements multi-user, multi-device login processes such that each device allows multiple users to be logged on (logged in) or logged off (logged out) that device simultaneously (concurrently). In one embodiment, user profile and activity are shared between the devices in a communication such as a local network of communal devices (e.g., televisions) and personal devices (e.g., handheld electronic devices, tablets, laptop computers, personal computers (PCs)).

A login control system according to an embodiment of the invention accepts simultaneous user logins on a group of devices (e.g., personal or communal devices), allowing user presence (e.g., login/logoff status) and information (e.g., identity) on each device to be shared among a plurality of electronic devices in the network.

In one embodiment of the invention, the devices may include hardware processor, memory, and logic and communication modules. For example, there are a number of large display screen devices (e.g., televisions) that are designed to be used or viewed by multiple users at the same time as communal devices. In many cases, there are multiple such devices in a single area (such as a television in each of several different rooms of a home). Such devices include general-purpose processors, communication mechanisms (e.g., one or more of Ethernet, Bluetooth, and Wi-Fi such as IEEE 802.11 WLAN, etc.), and the ability to host applications. Further, such devices store personalization information, preferences, and other information (collectively, "user profile").

A system according to an embodiment of the invention allows multiple such devices that operate on a communication mechanism (e.g., wireless and/or wired local area network) to share one or more user profiles. Therefore, multiple user profiles can be established and shared between the devices. Multiple users may be concurrently logged on to each device, and users of each device can determine (through, for example, the use of a heads-up display) the current state and location of other users (such as whether they are logged on to a different device, or logged off entirely).

Further, according to embodiments of the invention, the system allows users to log on and log off of the devices by various mechanisms, such as by key-presses on a remote control, through personal devices connected to the communication mechanism (e.g., wireless and/or wired local area network). Such personal devices (e.g., mobile phones, mobile electronic devices) also include display screens, and are termed "second-screen devices" herein. According to embodiments of the invention, the second-screen devices may further function as stores of information, and also as sources of login requests and optionally credentials.

Figure 1:
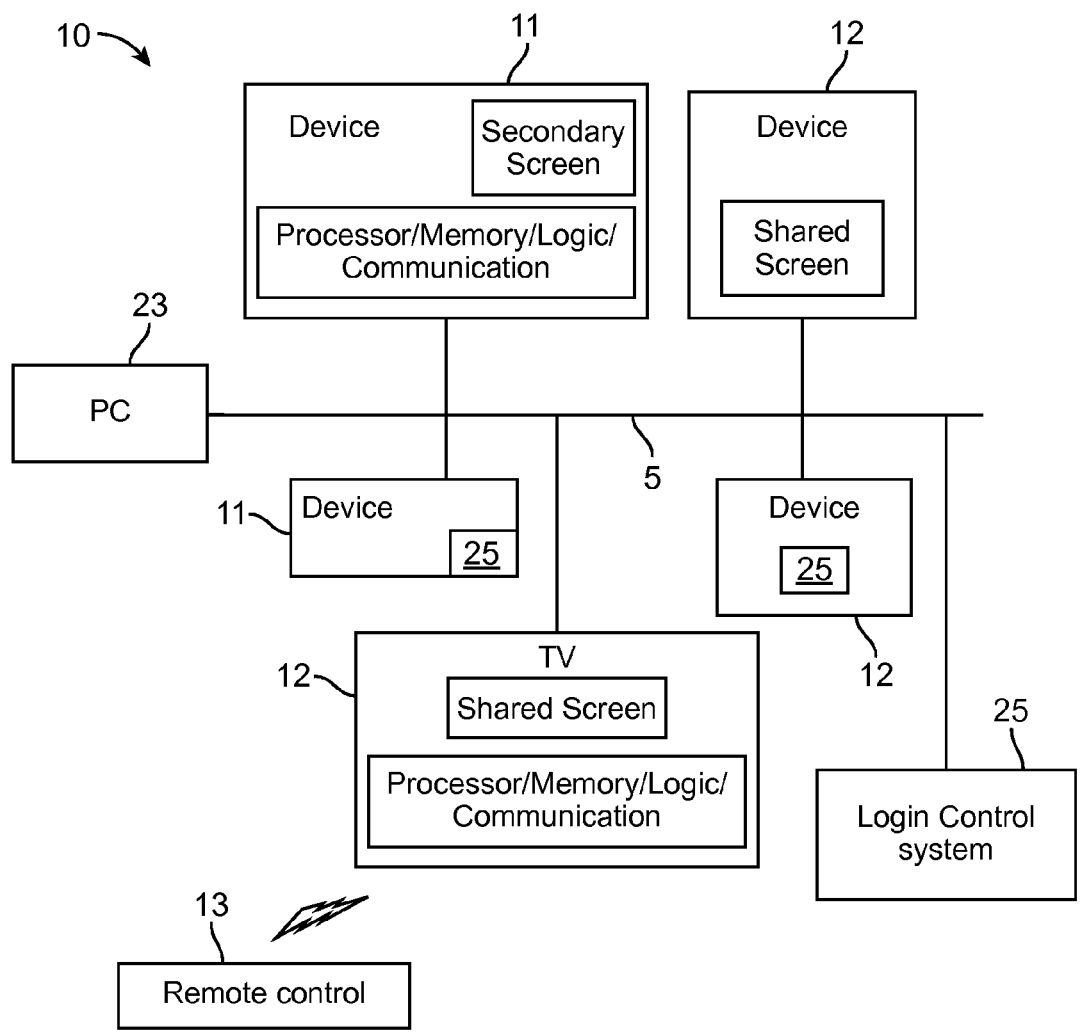
FIG. 1 shows a diagram of a communication system comprising a network for multi-user, multi-device login, according to an embodiment of the invention.

An example embodiment of the present invention is described below. FIG. 1 shows a multi-user, multi-device system 10, according to an embodiment of the invention. The system 10 implements a method for managing logins and user profiles across a number of devices, such that multiple users can use each of multiple "shared-screen" devices 12, with a coherent, persistent login state between the devices 12.

In this embodiment, there are one or more devices 12 with large shared display screens designed for viewing by multiple users (e.g., communal devices such as televisions). The large display screen devices 12 comprise general-purpose processors, memory, the ability to host applications and a communication mechanism (e.g., a network connection such as Ethernet, or Wi-Fi, Bluetooth, USB, or any other one-to-one or many-to-many communication mechanism).

Further, the system 10 may optionally include one or more personal second-screen devices 11 through which users log in and out of the various shared-screen devices 12 (among other operations). These second-screen devices 11 share a communication mechanism (such as a wired or wireless network connection 5) that is compatible with the devices 12, as well as having the ability to host applications. Examples of devices 11 include mobile electronic devices such as mobile phone devices, personal digital assistant devices, etc. The system 10 may further include computing devices such as a PC 23.

In one embodiment, the system 10 further includes a login control system (login system or login controller) 25 implementing functions for multi-user, multi-device login, according to the invention. The login control system 25 may be implemented in a stand alone device (as shown), or one or more of the devices 11, 12 may each include a login system 25 therein, or functionality of the login control system 25 may be implemented by the devices 11, 12 collectively. As such, implementation of the multi-user, multi-device login function is not limited to the examples shown.

Figure 2:
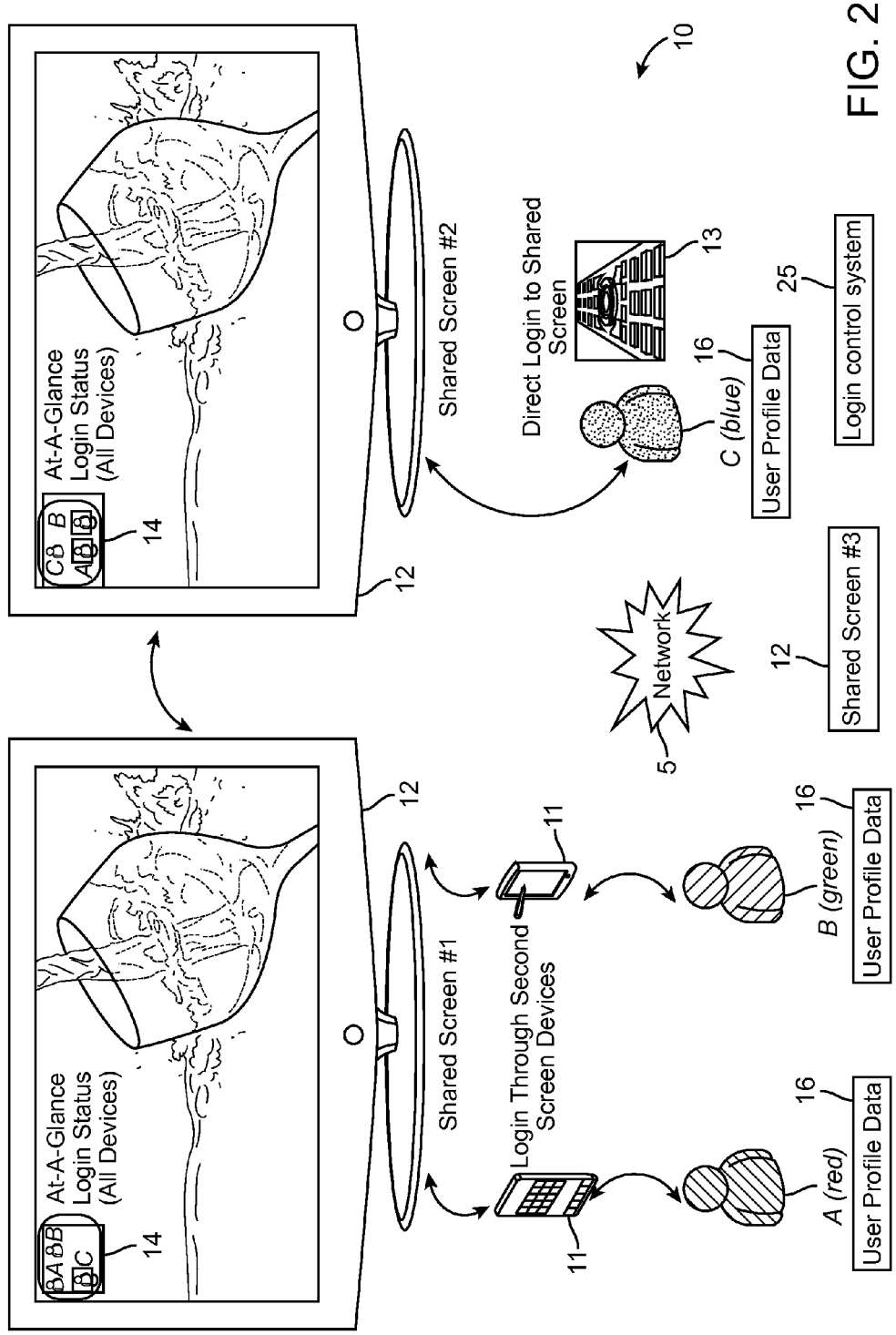
FIG. 2 illustrates an implementation of a multi-user, multi-device system, according to an embodiment of the invention.

FIG. 2 illustrates an implementation of the system 10 including the login control system 25, wherein in one example scenario three users interact with the multi-user, multi-device login system 10, using two different shared-screen devices 12 (e.g., televisions Shared-screen #1 device and Shared-screen #2 device), and different login mechanisms. The leftmost user A is utilizing a second-screen device 11 (e.g., mobile electronic device) to log on to the system 10. Specifically, using the second-screen device 11, the user A has logged on to Shared-screen #1 device 12. User B is utilizing a different second-screen device 11 (e.g., an electronic tablet-style device) to also log on to the system 10. Specifically, user B also chose to log on to Shared-screen #1 device 12.

A third user C has elected to log on directly to Shared-screen #2 device 12 without using a second-screen device 11, but simply using a remote control for Shared-screen #2 device 12 to log on to the system 10 (and to the Shared-screen #2 device 12). As such, in this example, there are three users logged on to the system 10. The users A and B are concurrently logged on to Shared-screen #1 device 12, and the user C is logged in to Shared-screen #2 device 12.

Users A and B are able to access information based on user profiles of both users A and B on the Shared-screen #1 device 12, while user C has a more typical experience with Shared-screen #2 device 12 with only a single active profile for user C. In addition, each user can monitor a second-screen device 11 or their shared-screen device 12 (e.g., using graphical user interface 14) to determine which users are logged on to the system 10 as a whole, and which device each user is logged on to. Each user interfaces 14 shown provides an example presentation of information. According to embodiments of the invention any suitable heads-up display (or no display at all) can be integrated with the login and profile mechanism.

Figure 3A:
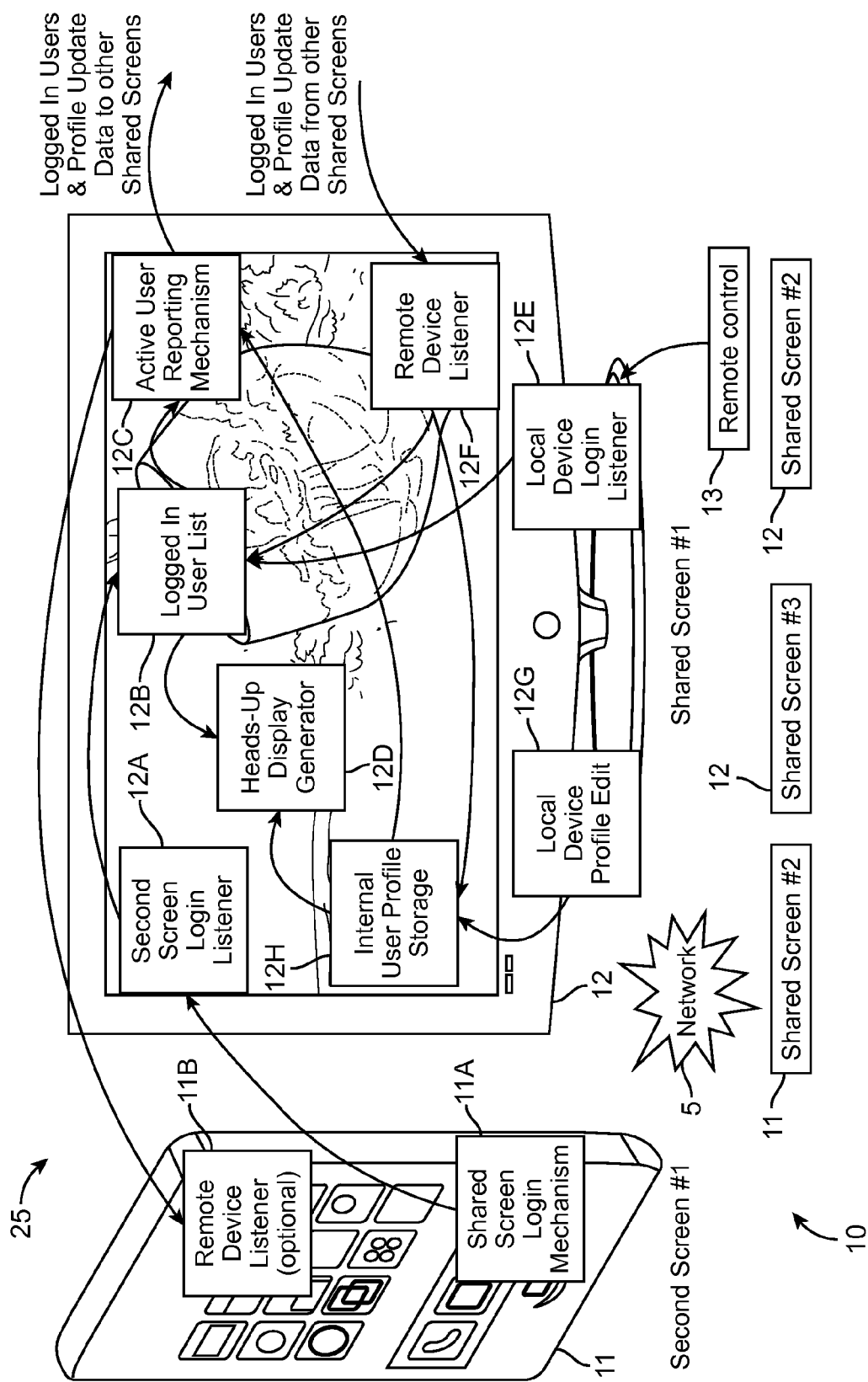
FIG. 3A illustrates a multi-user, multi-device login control system, according to an embodiment of the invention.

FIG. 3A illustrates details of an embodiment of the login control system 25 including modules in a second-screen device 11 (Second-screen #1) and a shared-screen device 12 (Shared-screen #1), in an implementation of the system 10 according to an embodiment of the invention. FIG. 3A also illustrates an operation process, as well as the communications between the devices 11 and 12 (e.g., using a wired and/or wireless network 5), according to an embodiment of the invention. The login system 25 comprises a shared-screen login module (mechanism) 11A, a remote device listener module 11B, a second-screen login listener module 12A, a logged in user list module 12B, an active user reporting module 12C, a heads-up display generator module 12D, a local device login listener module 12E, a remote device listener module 12F, a local device profile edit module 12G, and an internal user profile storage 12H, as described herein below.

When users log on to the system 10 via the second-screen device 11, a login command is sent from the shared-screen login module 11A in the Second-screen #1 device 11 to the second-screen login listener module 12A in Shared-screen #1 device 12.

The login listener module 12A receives the command and updates the logged in users list module 12B for the Second-screen #1 device 12. This information is sent to other shared-screen devices 12 (as well as other second-screen devices 11) through the active user reporting module 12C, and also rendered to the display screens of the Second-screen #1 device 11 and/or Shared-screen #1 device 12 using the heads-up display generator module 12D.

When a user logs on directly to the Shared-screen #1 device 12, such as through a wireless (Infrared) remote control 13 (FIG. 1), the local device login listener module 12E receives the login command, and updates the logged-in users list module 12B. As before, the active user reporting mechanism module 12C propagates this information to other devices (second-screen devices 11 and shared-screen devices 12).

A login location mechanism allows the system 10 as a whole to provide a single consensus view of which users are logged on to which devices in the system 10 based on the order in which user commands are received, and based on the devices in the system 10 to which the commands are sent.

The remote device listener module 12F listens for updates from the active user reporting module 12C on other shared-screen devices. The modules 12C and 12F keep a consistent state between all shared-screen devices. All changes made on one device are replicated to other devices. The active user reporting module 12C is also used to send similar updates to second-screen devices 11. The local device profile edit module 12G processes changes (made through a second-screen or remote control input) to a user profile data 16 (FIG. 2). The module 12G accepts the edits, processes them, and updates other modules (mainly the internal user profile storage 12H).

According to an embodiment of the invention, in the system 10 each user may be logged into one shared-screen device 12 and one second-screen device 11 at any given time. For example, if a user is logged on to Shared-screen #1 device 12 via a Second-screen #1 device 11, and then that user sends a login command to Shared-screen #2 device 12 from the same Second-screen #1 device 11, the user is logged out of Shared-screen #1 device 12 and logged into Shared-screen #2 device 12. If the user then utilizes a new second-screen device 11 (such as Second-screen #2 device), to log into Shared-screen #3 device 12, the user is logged out of the Second-screen #1 device 11, and also logged out of the Shared-screen #2 device 12, and logged into the new Second-screen #2 device 11 and the Shared-screen #3 device 12.

In one embodiment of the invention, each user of the multi-user, multi-device system 10 can have a full set of user-specific profile data 16 (FIG. 2) associated therewith. In one example, user-specific profile data 16 for the users is maintained in a memory device 12H in one or more shared-screen devices 12. In one implementation, the user profile data 16 for a user may include user statistics such as real name, age, and gender, but can also include additional information such as personal preferences for the operation of the shared-screen devices 12, preferences and other miscellaneous profile data associated with individual applications that are hosted on some or all of the shared-screen devices 12, etc.

When multiple users are active and logged on to the same shared-screen device 12, the users can interact with the information in user profile data 16 of each logged in user. In one embodiment, each user profile data 16 further includes "shared" profile information, which shared-screen devices 12 can generally access and display whenever a user is logged in. In one embodiment, each user profile data 16 further includes "private" profile information that can only be shared with the shared-screen device 12 a user is logged into, or displayed to users on any shared-screen device 12 by the explicit command of the user to whom the data is private.

In one embodiment, "Private" information is part of the profile data that is only available on the second-screen device unless explicit permission to share the information is given. This permission can, in certain embodiments, apply to only a single shared-screen device or apply to all shared-screen devices optionally based upon the type of permission granted by the user.

According to an embodiment of the invention, typically a second-screen device 11 is used to log on to the system 10. A two-tiered privacy mechanism is provided to allow the free sharing of innocuous data, as well as the controlled sharing of information that may be private or personal in nature to a user.

Figure 3B:
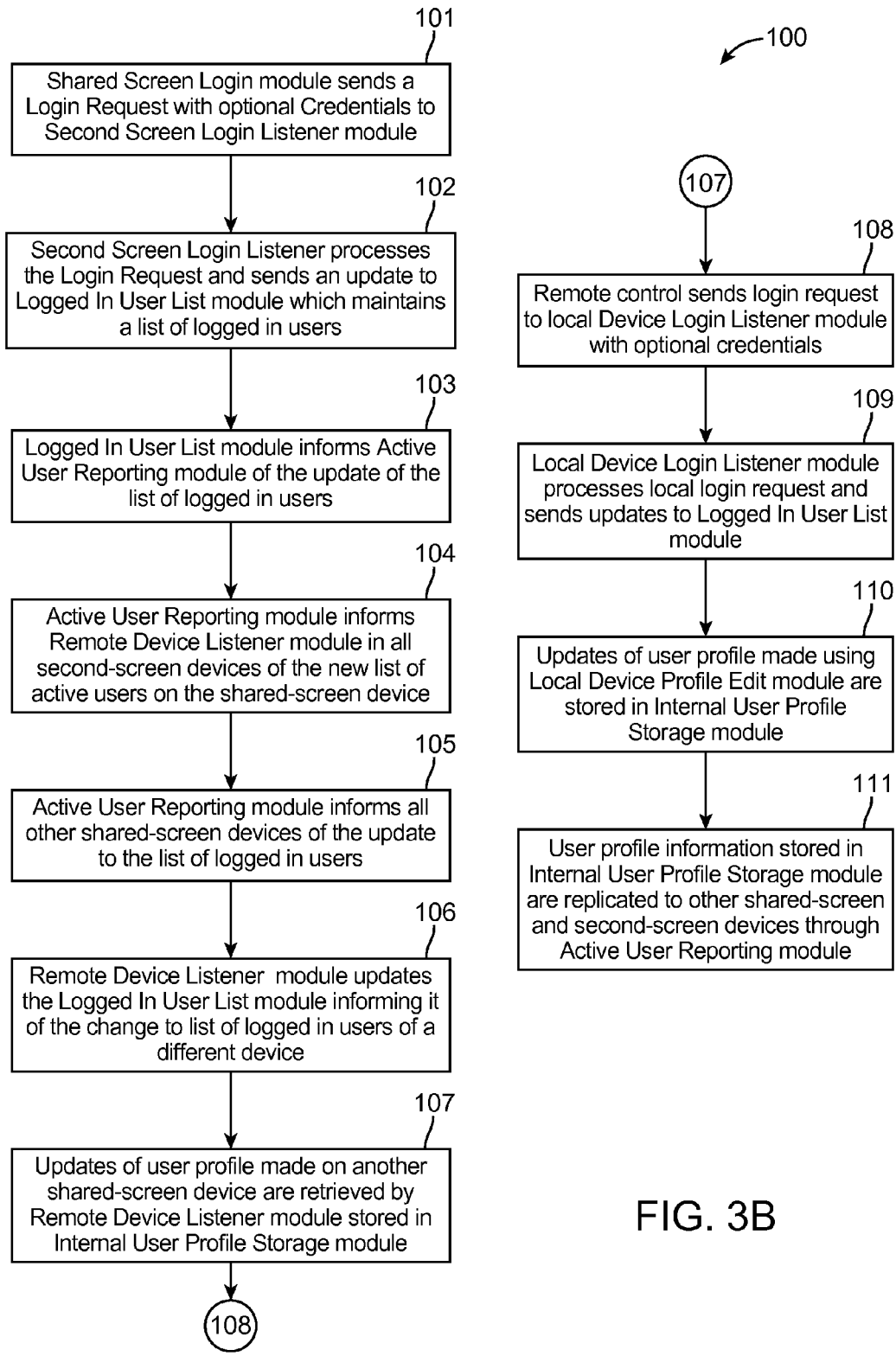
FIG. 3B illustrates a flowchart of an embodiment of a multi-user, multi-device login process implemented by the login control system of FIG. 3A, according to an embodiment of the invention.

FIG. 3B illustrates a flowchart of an embodiment of a multi-user, multi-device login process 100 implemented by the login system of FIG. 3A, according to an embodiment of the invention. The login process 100 includes the following process blocks:

Block 101: The shared-screen login module 11A sends a login request with optional credentials to the second-screen login listener module 12A.

Block 102: The second-screen login listener module 12A processes the login request and sends an update to the logged in user list module 12B which maintains a list of logged in users.

Block 103: The logged in user list module 12B informs the active user reporting module 12C of the update of the list of logged in users.

Block 104: The active user reporting module 12C informs the remote device listener module 11B in all second-screen devices of the new list of active users on the shared-screen device 12.

Block 105: The active user reporting module 12C informs all other shared-screen devices of the update to the list of logged in users. This information is received by the remote device listener module 12F of other second-screen devices.

Block 106: The remote device listener module 12F updates the logged in user list module 12B informing it of the change to the list of logged in users on a different device.

Block 107: Updates of user profile made on another shared-screen device are retrieved by the remote device listener module 12F and stored in the internal user profile storage module 12H.

Block 108: The remote control 13 sends a login request to the local device login listener module 12E with optional credentials.

Block 109: The local device login listener module 12E processes the local login request and sends updates to the logged in user list module 12B.

Block 110: Updates of user profile made using the local device profile edit module 12G are stored in the internal user profile storage module 12H.

Block 111: The user profile information stored by the internal user profile storage module 12H are replicated to other shared-screen and second-screen devices through the active user reporting module 12C.

The communications between the electronic devices in the examples illustrated in FIGS. 3A-3B are via the communication system 5. In one embodiment of the communication, all the electronic devices may be on a single network, and in one example certain devices may use e.g., Ethernet and others use e.g., Wi-Fi, for communication.

In another embodiment of the communication, the electronic devices may be part of a mesh network where the only requirement is that each device is connected to the other devices using a communication mechanism. For example, there may be an Ethernet Network between a first set of devices D1, D2, and D3. There may also be a separate Ethernet network with devices D4, D5, and D6. They may also be a one-to-one Bluetooth connection between D2 and D4. A login system according to an embodiment of the invention operates on all devices D1-D6 making extra "hops" across the Bluetooth as needed.

Figure 4A:
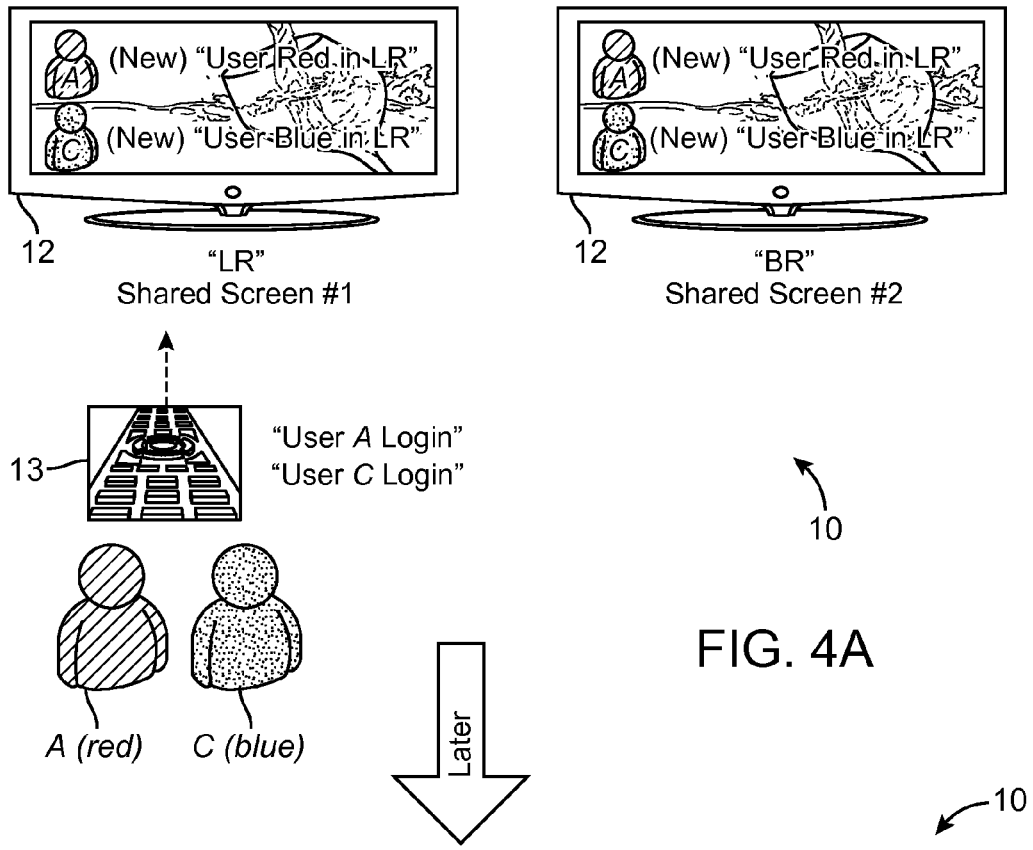
FIGS. 4A-4B illustrate example use-cases according to embodiments of the invention wherein multiple users of shared-screen devices log in/out of a multi-user, multi-device system, using one or more conventional remote controls.
Figure 4B:
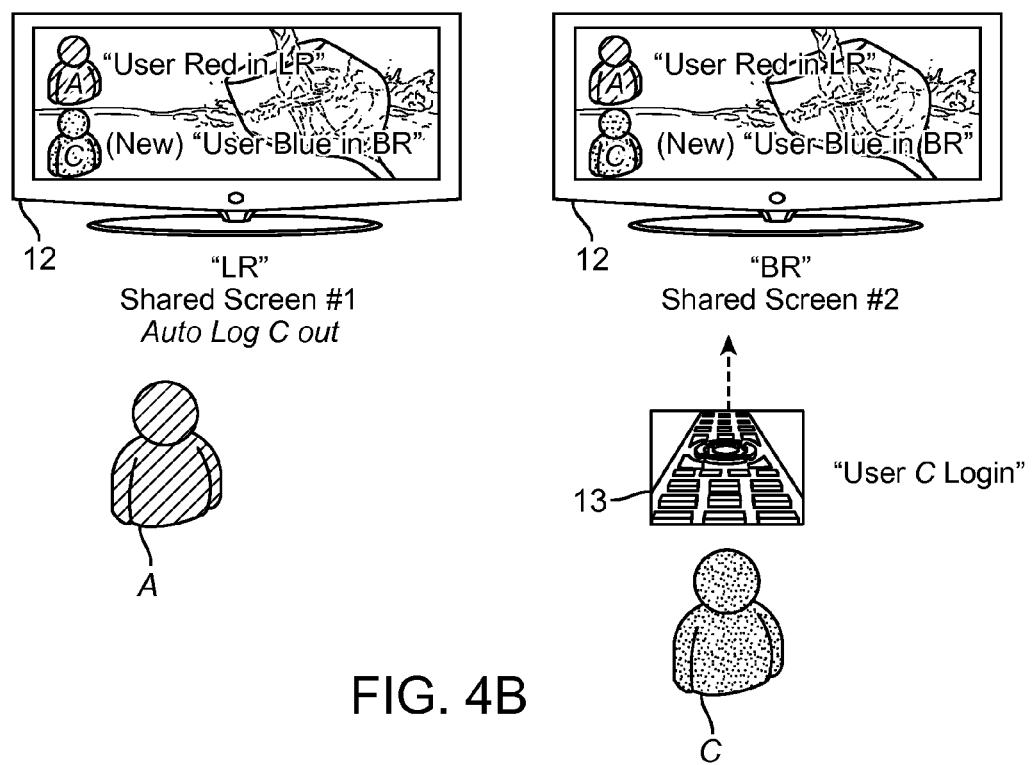

FIGS. 4A-4B illustrate example use-cases according to embodiments of the invention wherein multiple users of shared-screen devices 12 such as digital televisions (DTVs) log in/out of the network system 10 using one or more conventional remote controls 13. The shared-screen devices 12 are shown as Shared-screen #1 device and Shared-screen #2 device, wherein in example Shared-screen #1 device in a living room (LR) location in a house and Shared-screen #2 device in a bedroom (BR) location in the house.

Specifically, FIG. 4A illustrates each of users A and C utilizing a remote control 13 to directly log into a shared-screen LR device 12. As a result, both shared-screen LR device 12 and shared-screen BR device 12 display the login status of the users A and C as new users logged into shared-screen LR device 12.

FIG. 4B illustrates that at a later time while user A remains logged into shared-screen LR device 12, user C is automatically logged out of shared-screen LR device 12 when user C utilizes a remote control 13 to directly log into the shared-screen BR device 12. As a result, both shared-screen LR device 12 and shared-screen BR device 12 display the login status of the user A as logged into shared-screen LR device 12, and user C as a new user logged into shared-screen LR device 12.

Users logging in using the remote control 13 send requests to the local device login listener module 12E (FIG. 3A). When the requests, and optionally required credentials, are processed, the logged in user list module 12B is updated. This triggers output on the screen through the heads-up display generator module 12D and propagation to other devices through module 12C, other devices, and the module remote device listener module 12F. The module 12F then updates the logged in user list 12B module of the other devices, which updates the display on these other shared-screen devices through heads-up display generator module 12D. Log outs performed on a remote control 13 follow a similar sequence of processes.

Figure 5A:
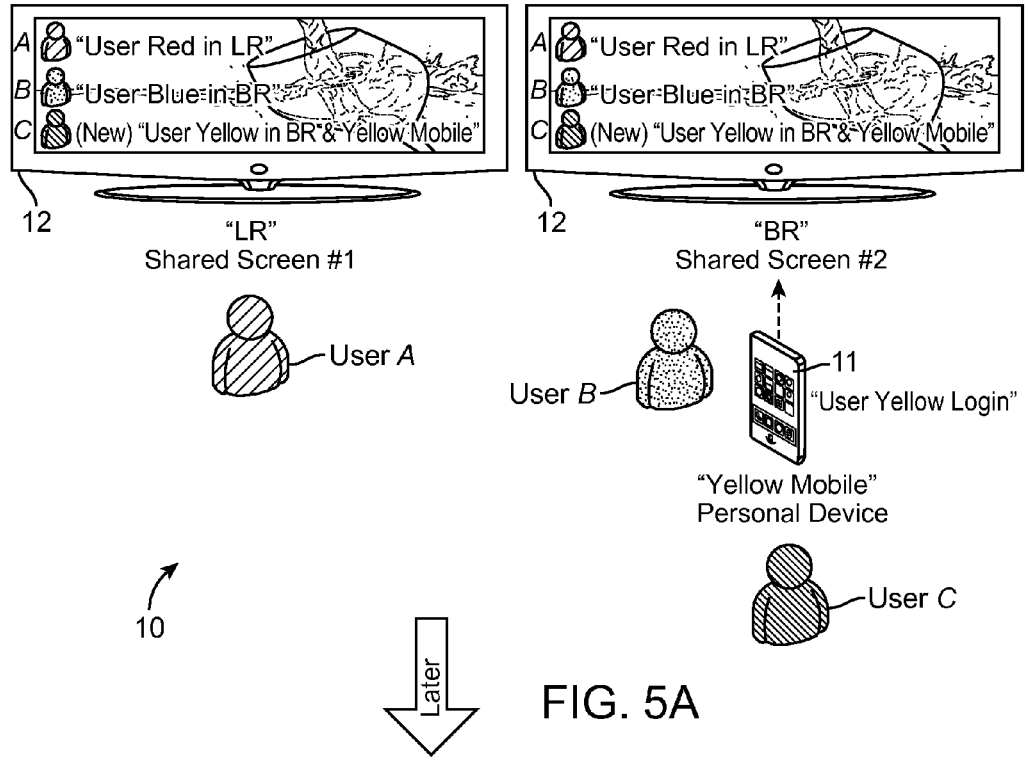
FIGS. 5A-5B illustrate example use-cases according to embodiments of the invention wherein multiple users of shared-screen devices log in/out of a multi-user, multi-device system, using second-screen devices.
Figure 5B:
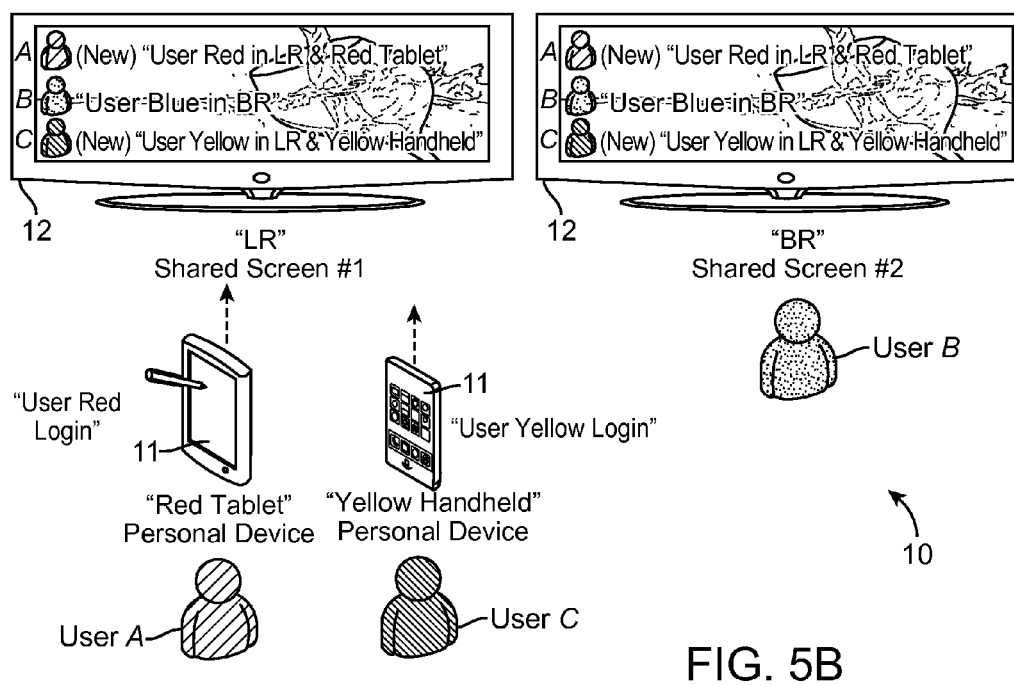

FIGS. 5A-5B illustrate example use-cases according to embodiments of the invention wherein multiple users of a shared-screen device 12 such as a digital television (DTV) log in/out of the network system 10 using one or more personal second-screen devices 11. Specifically, FIG. 5A illustrates user A previously logged into shared-screen LR device 12 and user B previously logged into shared-screen BR device 12. Then user C logs into shared-screen BR device 12 using a personal second-screen device 11. As a result, both shared-screen LR device 12 and shared-screen BR device 12 display the login status of the users A and C as logged into shared-screen LR device 12 and shared-screen BR device 12, respectively. Further, both shared-screen LR device 12 and shared-screen BR device 12 show user C as new user logged into shared-screen BR device 12.

FIG. 5B illustrates that at a later time user A utilizes a personal second-screen device 11 to log into the shared-screen LR device 12 (causing automatic log out and then logging into the shared-screen LR device 12). Further, user C utilizes a personal second-screen device 11 to log into the shared-screen LR device 12 (causing automatic log out from shared-screen BR device 12). User B remains logged into shared-screen BR device 12. As a result, both shared-screen LR device 12 and shared-screen BR device 12 display the login status of the users A and C as new users logged into shared-screen LR device 12, while login status display of user B remains unchanged.

A user logs on using a personal second-screen device 11. The shared-screen login mechanism module 11A (FIG. 3A) sends login request(s), and optionally required credentials to, the second-screen login listener module 12A. The module 12A processes the response and updates the logged in user list module 12B. The update is propagated, causing the local screen (Shared-Screen #2 in FIGS. 4A-4B and/or FIGS. 5A-5B) to update through the heads-up display generator 12D, sending messages to one or more other shared-screens devices through the communication mechanism using the module 12C, other devices, modules 12F, 12B and 12D, as described above in relation to FIGS. 4A-4B.

According to embodiments of the invention, in the examples operation scenarios illustrated in FIGS. 4A-4B and FIGS. 5A-5B:

Logging into a shared-screen device 12 (LR) may cause (not required) automatic log out from another shared-screen device 12 (BR) based on a condition such as "communal device singleton-flag".

Logging into a personal second-screen device 11 causes log out from a shared-screen device 12.

Logging into a personal second-screen device 11 may cause (not required) log out from another personal second-screen device based 11 on a "personal device singleton-flag".

In one embodiment of the invention, a user may be logged on to only one of each "class" of devices at a time (e.g., one second-screen device and one shared-screen device). In another embodiment of the invention, a user may be logged onto multiple second-screen devices but only one shared-screen device (or in yet other embodiments, vice-versa).

In another embodiment of the invention, there may be a setting within the system (stored in the shared-screen devices and replicated between them using the cycle through modules 12G to 12C to 12F to 12G (FIG. 3A)), indicating that specific users may only be logged onto a single shared-screen device or a single second-screen device. This setting may be user specific or system specific. Such information may be stored, for example, in the same repository as the module 12G, either using the module 12G or using an additional module with identical placement to the module 12G.

Figure 6A:
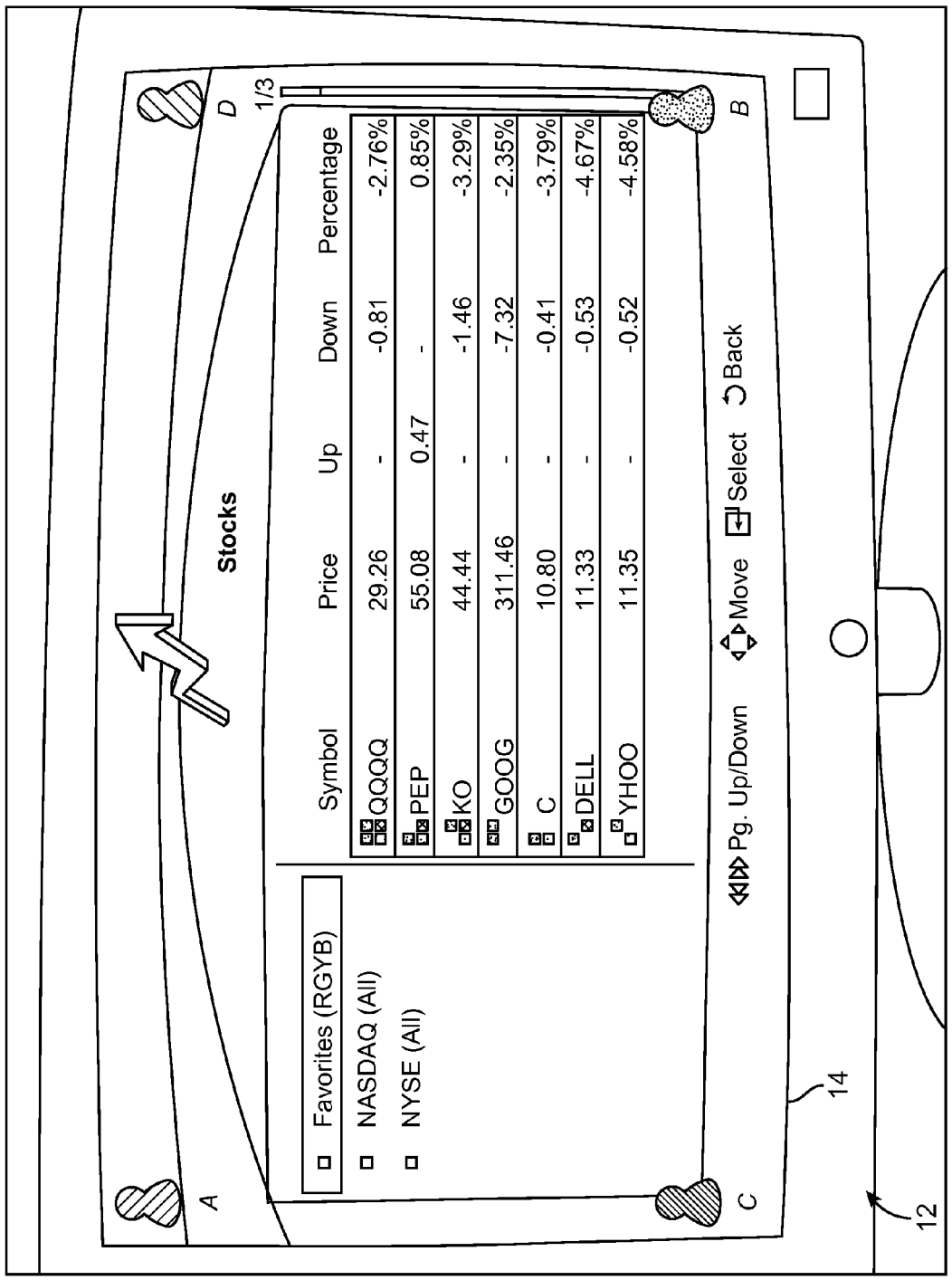
FIGS. 6A-6B illustrate example user interface representations for use-cases in a multi-user, multi-device login system wherein multiple users of shared-screen devices and personal second-screen devices log in/out of the system, according to embodiments of the present invention.
Figure 6B:
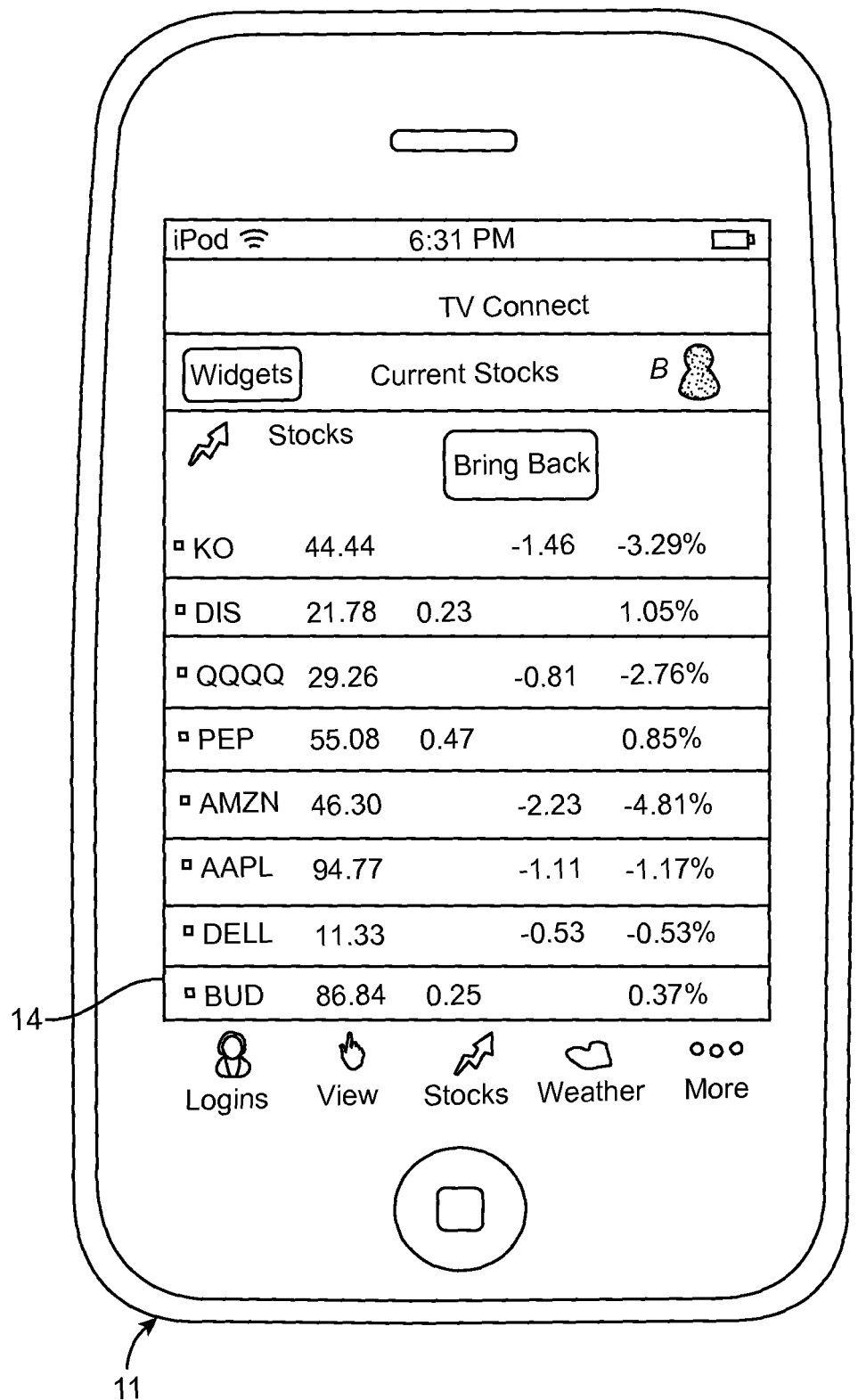

FIGS. 6A-6B illustrate example user interface representations for use-cases in the system 10 wherein multiple users of shared-screen devices 12 and personal second-screen devices 11 log in/out of the network system 10, according to embodiments of the present invention. The interactions/presentations are presented differently among shared-screen devices 12 (e.g., television shown in FIG. 6A) and personal second-screen devices 11 (e.g., mobile electronic device shown in FIG. 6B). For example, FIG. 6A shows a user interface display 14 on a television device 12, illustrating icons representing multiple users A, B, C and D logged into television device 12, along with other video content (e.g., multi-user stock (personal stock, shared stocks, etc.)).

FIG. 6B shows a user interface display 14 on a mobile device 11, illustrating icons representing logged in user B, along with other video content, wherein user B is concurrently logged into the television device 12 and the mobile device 11. In this example, the television 12 displays video content comprising information on financial stocks from all users A, B, C and D, while mobile device 11 in use by user B displays video content comprising only personal stock information for user B.

Figure 7:
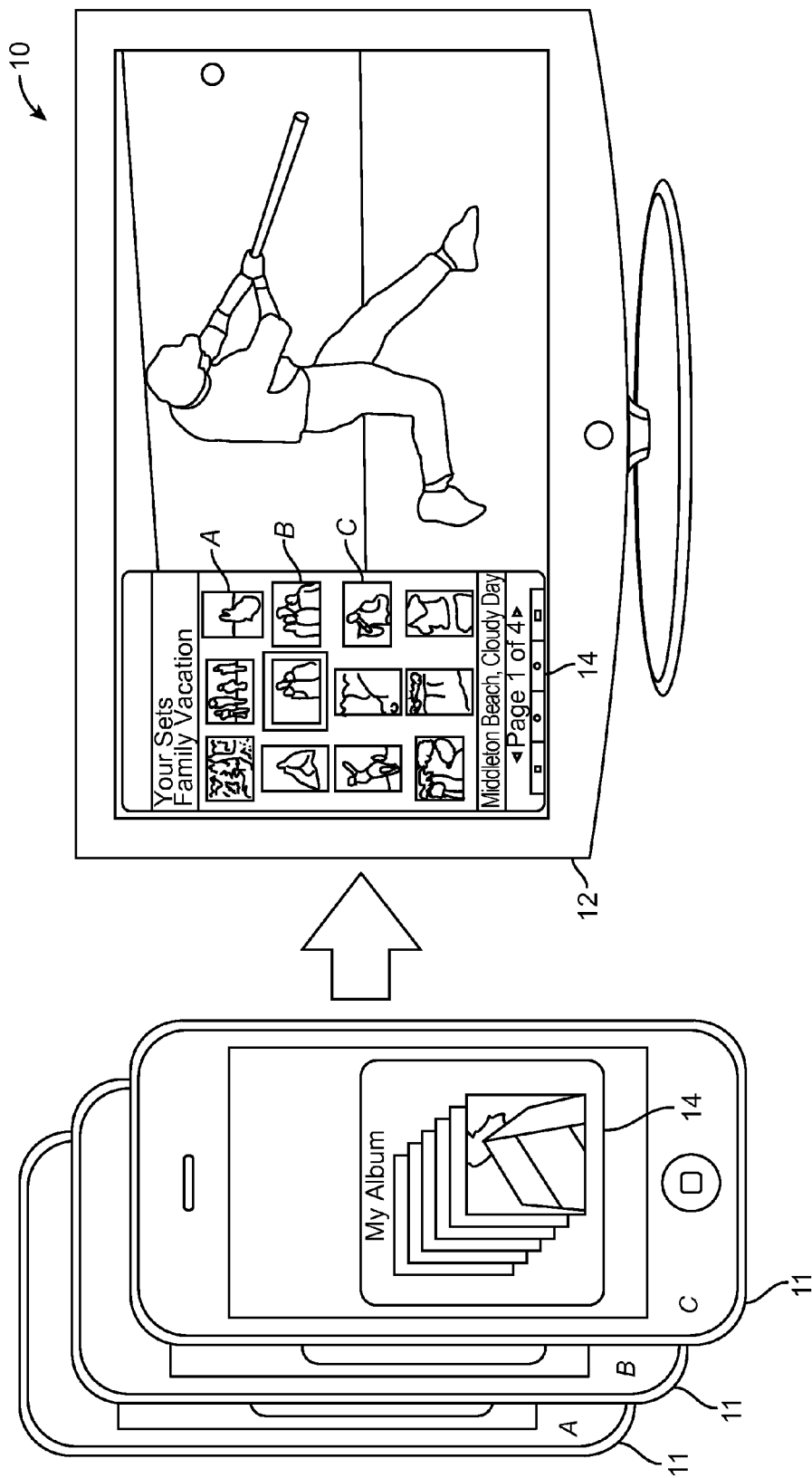
FIG. 7 illustrates a scenario wherein multiple users utilize an application when logged into a shared-screen device, while concurrently each of the users is individually also logged into their own personal mobile device, in a multi-user, multi-device login system, according to an embodiment of the invention.

FIG. 7 illustrates a scenario according to an embodiment of the invention, wherein multiple users (e.g., Users A, B, C, . . . ) utilizing a photo sharing application when logged into the shared television device 12 in the network system 10, while concurrently each of the users is individually also logged into their own personal mobile device 11. All photo albums of all logged in users are displayed in a user interface 14 on television device 12, while a personal photo album of each user is displayed on the handheld device 11 (e.g., using media Share, personal photo, shared photos).

Figure 8:
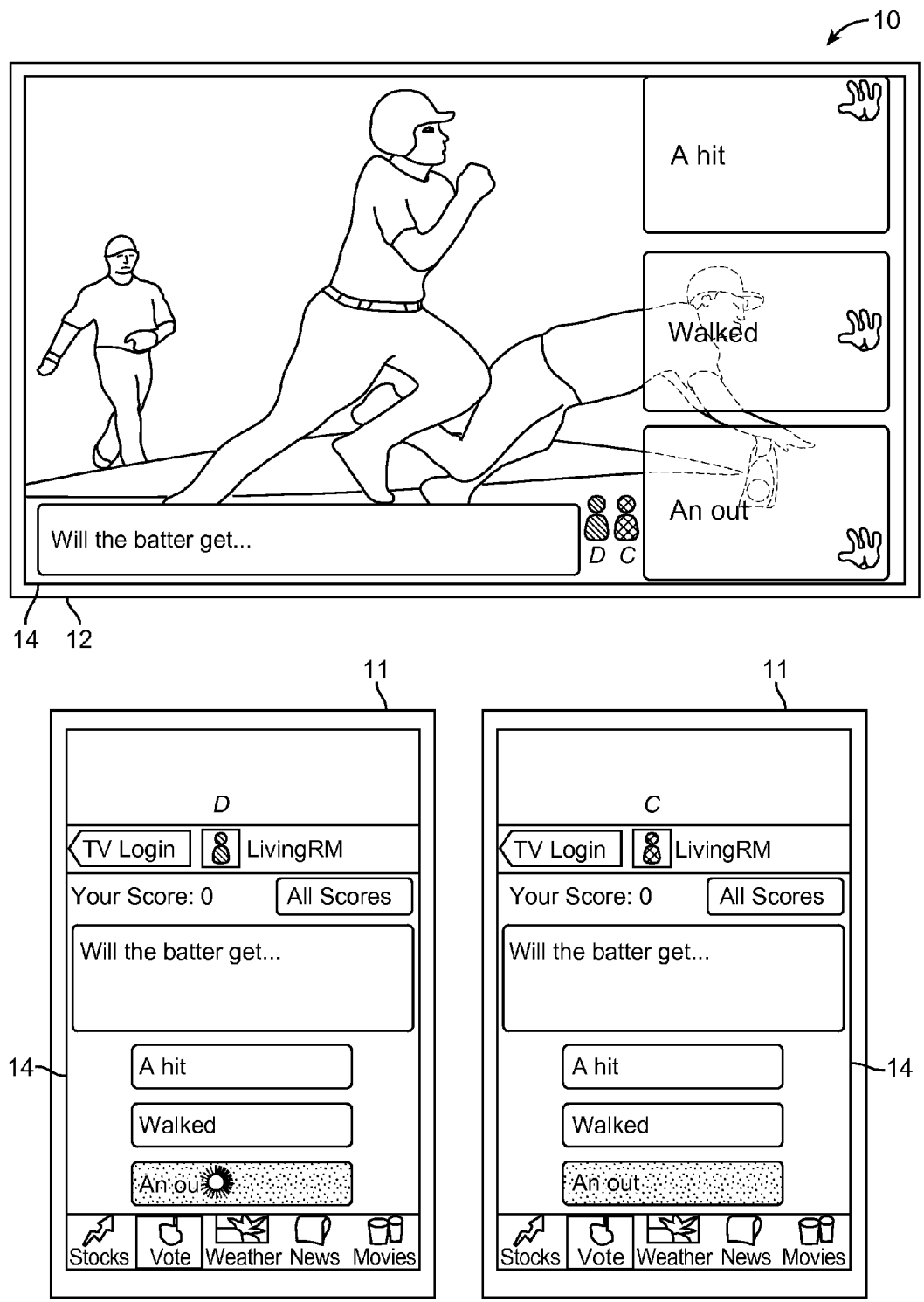
FIG. 8 illustrates a scenario, wherein multiple users are logged into a shared-screen device and also logged into their own respective personal mobile second-screen devices, in a multi-user, multi-device login system, according to an embodiment of the invention.

FIG. 8 illustrates a scenario according to an embodiment of the invention, wherein users C and D are logged into a shared-screen television device 12 displaying a user interface 14, and also logged into their own respective personal mobile second-screen devices 11, in a network system 10. When an interaction between the users occurs (e.g., vote on the outcome of a sports match on the display screen), the television device 12 displays and processes both user C and user D interactions together, while each personal mobile device 11 only displays and processes the interactions of its associated user individually.

Accordingly, embodiments of the invention provide a system-wide support mechanism for the active users and allow multiple devices that share a communication mechanism to use the same pool of user profiles. The system-wide support mechanism manages user logins between the multiple devices (as opposed to merely supporting login to a single device). Support for login through other mechanisms such as a second-screen device is also provided. Users may share the same display, and may interact. Users may also view the login-state of other users.

In another embodiment of the invention, there may be multiple types of communal or shared devices (e.g., a television and a jukebox-like device). In such an embodiment, each user may be logged into one instance of each type of shared device, rather than merely to one personal second-screen device and a single shared-screen device. A "shared-screen" need not be only a device whose primary function is as a visual display. A multi-user jukebox device connected to the multi-user, multi-device system 10, according to an embodiment of the invention, may serve as a "shared-screen" device even if it has no standard monitor-type display.

According to embodiments of the present invention, the terms "mechanism" and "module" as used herein include architectures such as program instructions for execution by a processor, as software modules, microcode, as hardware modules, as computer program product on computer readable media, as logic circuits, as application specific integrated circuits, as firmware, etc. Further, embodiments of each mechanism or module can take the form of an entirely hardware embodiment, an entirely software embodiment or an embodiment containing both hardware and software elements.

Embodiments of the present invention provide a system implementing a process that allows multiple users to share the same user profile information between multiple electronic devices sharing a communication mechanism (e.g., a network), and for users of each device to determine at-a-glance the login status of users on other devices. In addition, the support of multiple different devices, and multiple login mechanisms (including the "second-screen" devices) enables users to interact more freely with the devices in the network. Communication of login information between the different devices in the system allows a login control system/module in the multi-device system to keep track of, and display on multiple display screens, information about which devices various users are using, and take appropriate action including, for example, logging a user out of one "shared-screen" device when the users log in to a different "shared-screen" device in the system. The login control system/module further manages login state between devices in the system without the need for an authentication server or "domain controller" such as in complex business systems.

As is known to those skilled in the art, the aforementioned example architectures described above, according to the present invention, can be implemented in many ways, such as program instructions for execution by a processor, as software modules, microcode, as computer program product on computer readable media, as logic circuits, as application specific integrated circuits, as firmware, as consumer electronic devices, etc., in wireless devices, in wireless transmitters/receivers, in wireless networks, etc. Further, embodiments of the invention can take the form of an entirely hardware embodiment, an entirely software embodiment or an embodiment containing both hardware and software elements.

Figure 9:
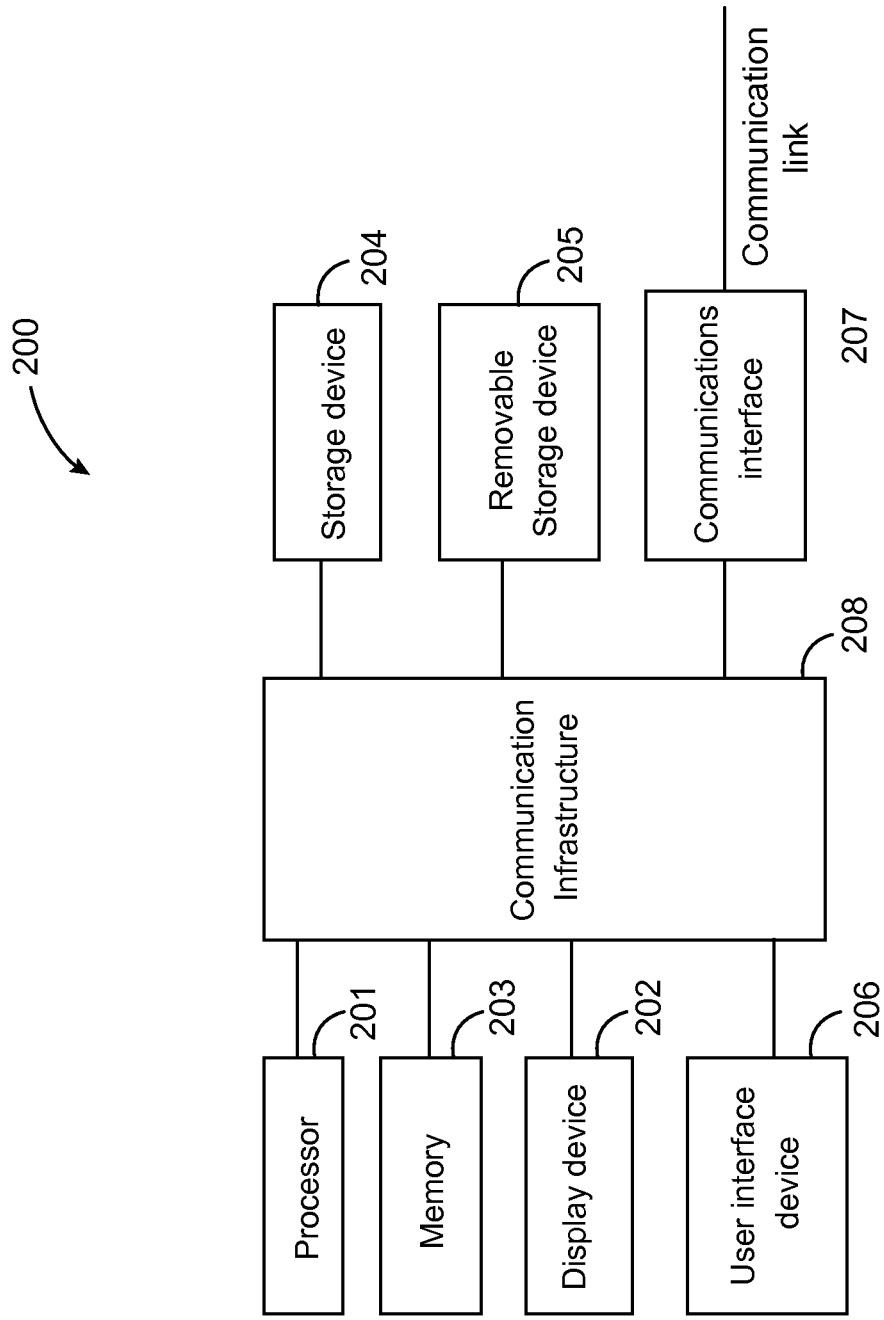
FIG. 9 is a high level block diagram showing an information processing system comprising a computer system useful for implementing an embodiment of the present invention.

FIG. 9 is a high level block diagram showing an information processing system comprising a computer system 200 useful for implementing an embodiment of the present invention. The computer system 200 includes one or more processors 201, and can further include an electronic display device 202 (for displaying graphics, text, and other data), a main memory 203 (e.g., random access memory (RAM)), storage device 204 (e.g., hard disk drive), removable storage device 205 (e.g., removable storage drive, removable memory module, a magnetic tape drive, optical disk drive, computer readable medium having stored therein computer software and/or data), user interface device 206 (e.g., keyboard, touch screen, keypad, pointing device), and a communication interface 207 (e.g., modem, a network interface (such as an Ethernet card), a communications port, or a PCMCIA slot and card). The communication interface 207 allows software and data to be transferred between the computer system and external devices. The system 200 further includes a communications infrastructure 208 (e.g., a communications bus, cross-over bar, or network) to which the aforementioned devices/modules 201 through 207 are connected.

Information transferred via communications interface 207 may be in the form of signals such as electronic, electromagnetic, optical, or other signals capable of being received by communications interface 207, via a communication link that carries signals and may be implemented using wire or cable, fiber optics, a phone line, a cellular phone link, a radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments of the present invention have been described with reference to flowchart illustrations and/or block diagrams of methods, apparatus (systems) and computer program products according to embodiments of the invention. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic, implementing embodiments of the present invention. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Furthermore, the computer readable medium may comprise computer readable information in a transitory state medium such as a network link and/or a network interface, including a wired network or a wireless network, that allow a computer to read such computer readable information. Computer programs (i.e., computer control logic) are stored in main memory and/or secondary memory. Computer programs may also be received via a communications interface. Such computer programs, when executed, enable the computer system to perform the features of the present invention as discussed herein. In particular, the computer programs, when executed, enable the processor multi-core processor to perform the features of the computer system. Such computer programs represent controllers of the computer system.

Though the present invention has been described with reference to certain versions thereof; however, other versions are possible. Therefore, the spirit and scope of the appended claims should not be limited to the description of the preferred versions contained herein.

What is claimed is:

1. A method comprising:
in response to user login requests, controlling login access by providing multiple different users login access to plural electronic devices of multiple electronic devices capable of communicating via a communication system, each electronic device of the multiple electronic devices allowing multiple users to be logged on or logged off the electronic device concurrently;
sharing user profile data and activity between the plural electronic devices, wherein multiple different users logged on to a same electronic device each has an individual user profile comprising user preferences and data associated with one or more individual applications hosted on a shared screen device;
providing for user interaction with information in user profile data of logged on users; and
displaying on a first of the plural electronic devices an identity of a second of the plural electronic devices and an identity of the one or more of the multiple different users logged on the second of the plural electronic devices.

2. The method of claim 1, further comprising:
controlling login access by accepting concurrent multiple different user logins to each of the plural electronic devices;
maintaining user login status; and
sharing user login status information among the multiple electronic devices via the communication system.

3. The method of claim 2, further comprising:
providing said user login status information to users of the multiple electronic devices.

4. The method of claim 3, further comprising:
maintaining the user profile data for each user, the user profile data including: user identification information, user personal preference information, the data associated with the one or more individual applications hosted on the shared screen device, shared profile information, and private profile information.

5. The method of claim 4, further comprising:
sharing information from user profile data of multiple different users among multiple electronic devices via the communication system, wherein each of the multiple different users is concurrently logged into one or more of the multiple electronic devices in the communication system.

6. The method of claim 5, further comprising:
providing each logged in user of an electronic device information about current state and location of other different logged in users of the multiple electronic devices in the communication system.

7. The method of claim 2, wherein:
at least one of the plural electronic devices comprises a communal electronic device configured for concurrent and shared use by multiple different users in a single location.

8. The method or claim 7, wherein:
at least one of the plural electronic devices comprises a personal electronic device configured for use by an individual user.

9. The method of claim 8, further comprising:
controlling login access wherein each user may be concurrently logged into a personal electronic device and a communal electronic device.

10. The method of claim 8, further comprising:
controlling login access by accepting a user login to a communal device utilizing a personal electronic device.

11. The method of claim 8, further comprising:
controlling login access by accepting a user login directly to a communal electronic device.

12. The method of claim 8, wherein:
the communication system comprises a network interconnecting the multiple electronic devices.

13. The method of claim 8, further comprising:
controlling login access by automatically logging out a user from a communal electronic device upon accepting that user login into a personal electronic device in the communication system.

14. The method of claim 8, further comprising:
controlling login access by accepting multiple different users login to a communal electronic device concurrently, and accepting a single one of the multiple different users login into a personal electronic device;
displaying information of the multiple different users on the communal electronic device; and
displaying information of only the single one of the multiple different users only on the personal electronic device.

15. The method of claim 8, further comprising:
controlling login access by accepting multiple different users login to a communal electronic device concurrently, and accepting each of the multiple different users login into a respective personal electronic device;
displaying information of the multiple different users on a display of the communal electronic device; and
displaying information of only each one of the multiple different users only on the respective personal electronic device for that user.

16. The method of claim 7, further comprising:
controlling login access by automatically logging out a user from a communal electronic device upon accepting that user login into another communal electronic device in the communication system.

17. The method of claim 7, wherein the single location comprises a home.

18. The method of claim 1, wherein the identity of the second of the plural electronic devices identifies a physical location of the second of the plural electronic devices.

19. The method of claim 1, wherein each of the different multiple users has user-specific profile information and also share a same user profile between multiple electronic devices and is provided user login status for the multiple electronic devices.

20. The method of claim 1, wherein the multiple electronic devices comprise personal mobile devices and shared devices.

21. The method of claim 1, wherein the multiple different users logged on to the same electronic device share user profile information from each individual user profile.

22. A login system comprising:
a processor device;
a login controller that uses the processor device to provide multiple different users login access to plural electronic devices of multiple electronic devices in response to login requests, wherein the multiple electronic devices are capable of communicating via a communication system;
the login controller further uses the processor device to provide control for each electronic device of the plural electronic devices allowing multiple different users to be logged on or logged off the electronic device concurrently, to share user profile data and activity between the plural electronic devices, and to provide for user interaction with information in user profile data of logged on users, wherein multiple different users logged on to a same electronic device each has an individual user profile comprising user preferences and data associated with one or more individual applications hosted on a shared screen device; and the login controller further uses the processor device to provide for a first of the plural electronic devices to display an identity of a second of the plural electronic devices and an identity of one or more of the multiple different users logged on the second of the electronic devices.

23. The login system of claim 22, wherein:
the login controller uses the processor device for controlling login access by accepting concurrent multiple different user logins to each of the plural electronic devices, maintaining user login status, and sharing user login status information among the multiple electronic devices via the communication system.

24. The login system of claim 23, wherein:
the login controller uses the processor device for providing said user login status information to users of the multiple electronic devices.

25. The login system of claim 24, wherein:
the login controller uses the processor device for maintaining profile data for each user, the profile data including: user identification information, user personal preference information, the data associated with the one or more individual applications hosted on the shared screen device, shared profile information, and private profile information.

26. The login system of claim 25, wherein:
the login controller uses the processor device for sharing information from user profile data of multiple different users among the multiple electronic devices via the communication system, wherein each of the multiple different users is concurrently logged into one or more of the multiple electronic devices in the communication system.

27. The login system of claim 26, wherein:
the login controller uses the processor device for providing each logged in user of an electronic device information about current state and location of other logged in users of multiple electronic devices in the communication system.

28. The login system of claim 23, wherein:
at least one of the plural electronic devices comprises a communal electronic device configured for concurrent and shared use by multiple different users;
at least one of the plural electronic devices comprises a personal electronic device configured for use by an individual user; and
the login controller uses the processor device for controlling login access wherein each user may be concurrently logged into a personal electronic device and a communal electronic device.

29. The login system of claim 28, wherein:
the login controller uses the processor device for controlling login access by accepting a user login to a communal device utilizing a personal electronic device.

30. The login system of claim 28, wherein:
the login controller uses the processor device for controlling login access by accepting a user login directly to a communal electronic device.

31. The login system of claim 28, wherein:
the communication system comprises a network interconnecting the multiple electronic devices.

32. The login system of claim 28, wherein:
the login controller uses the processor device for controlling login access by automatically logging out a user from a communal electronic device upon accepting that user login into another communal electronic device in the communication system.

33. The login system of claim 28, wherein:
the login controller uses the processor device for controlling login access by automatically logging out a user from a communal electronic device upon accepting that user login into a personal electronic device in the communication system.

34. The login system of claim 28, wherein:
the login controller uses the processor device for controlling login access by accepting multiple different users login to a communal electronic device concurrently, and accepting a single one of the multiple different users login into a personal electronic device; and
the login controller uses the processor device for displaying information of the multiple different users on a display of the communal electronic device, and displaying information of only the single one of the multiple different users only on the personal electronic device.

35. The login system of claim 28, wherein:
the login controller uses the processor device for controlling login access by accepting multiple different users login to a communal electronic device concurrently, and accepting each of the multiple different users login into a respective personal electronic device; and
the login controller uses the processor device for displaying information of the multiple different users on the communal electronic device, and displaying information of only each one of the multiple different users only on the respective personal electronic device for that user.

36. The login system of claim 22, wherein the identity of the second of the plural electronic devices identifies a physical location of the second of the plural electronic devices.

37. The login system of claim 22, wherein the multiple different users logged on to the same electronic device share user profile information from each individual user profile.

38. A system, comprising:
a processor device;
multiple electronic devices capable of communicating via a communication system;
a login controller that uses the processor device providing multiple different users login access to plural electronic devices of the multiple electronic devices in response to login requests;
the login controller uses the processor device to provide control for each electronic device of the plural electronic devices allowing multiple different users to be logged on or logged off the electronic device concurrently, to share user profile data and activity between the plural electronic devices, and to provide for user interaction with information in user profile data of multiple logged on users, wherein multiple different users logged on to a same electronic device each has an individual user profile comprising user preferences data and data associated with one or more individual applications hosted on a shared screen device and share user profile information from each individual user profile data; and
a first of the plural electronic devices configured to display an identity of a second of the plural electronic devices and an identity of the one or more of the multiple different users logged on the second of the plural electronic devices.

39. The system of claim 38, wherein:
the login controller uses the processor device for controlling login access by accepting concurrent multiple different user logins to each of the plural electronic devices, maintaining user login status, and sharing user login status information among the multiple electronic devices via the communication system; and
the login controller uses the processor device for providing said user login status information to users of the multiple electronic devices.

40. The system of claim 39, wherein:
the login controller uses the processor device for maintaining user profile data for each user, the user profile data including: user identification information, user personal preference data, shared profile information, private profile information and the data associated with the one or more individual applications hosted on the shared screen device; and
the login controller uses the processor device for sharing information from user profile data of multiple different users among the multiple electronic devices via the communication system, wherein each of the multiple different users is concurrently logged into one or more of electronic devices in the communication system.

41. The system of claim 40, wherein:
the login controller uses the processor device for providing each logged in user of an electronic device information about current state and location of other logged in users of the plural electronic devices in the communication system.

42. The system of claim 41, wherein:
at least one of the plural electronic devices comprises a communal electronic device configured for concurrent and shared use by multiple different users;
at least one of the plural electronic devices comprises a personal electronic device configured for use by an individual user; and
the login controller uses the processor device for controlling login access wherein each user may be concurrently logged into a personal electronic device and a communal electronic device.

43. The system of claim 42, wherein the login controller uses the processor device for controlling login access by:
automatically logging out a user from a communal electronic device upon accepting that user login into another communal electronic device in the communication system.

44. The system of claim 43, wherein:
the login controller uses the processor device for controlling login access by accepting multiple different users login to a communal electronic device concurrently, and accepting a single one of the multiple different users login into a personal electronic device; and
the login controller uses the processor device for displaying information of the multiple different users on a display of the communal electronic device, and displaying information of only the single one of the multiple different users only on the personal electronic device.

45. The system of claim 43, wherein:
the login controller uses the processor device for controlling login access by accepting multiple different users login to a communal electronic device concurrently, and accepting each of the multiple different users login into a respective personal electronic device; and
the login controller uses the processor device for displaying information of the multiple different users on a display of the communal electronic device, and displaying information of only each one of the multiple different users only on the respective personal electronic device for that user.

46. The system of claim 42, wherein the login controller uses the processor device for controlling login access by:
automatically logging out a user from a communal electronic device upon accepting that user login into a personal electronic device in the communication system.

47. The system of claim 38, wherein:
the communication system comprises a network interconnecting the multiple electronic devices.

48. The system of claim 38, wherein the identity of the second of the plural electronic devices identifies a physical location of the second of the plural electronic devices.

* * * * *